United States Patent [19]
Lee

[11] 4,078,238
[45] Mar. 7, 1978

[54] MAGNETIC DEFLECTOR FOR A MAGNETIC INK JET PRINTER

[75] Inventor: Ho Chong Lee, Endicott, N.Y.

[73] Assignee: International Business Machines Corporation, Armonk, N.Y.

[21] Appl. No.: 745,026

[22] Filed: Nov. 26, 1976

[51] Int. Cl.[2] ........ G01D 15/18
[52] U.S. Cl. ........ 346/75
[58] Field of Search ........ 346/75

[56] References Cited

U.S. PATENT DOCUMENTS 3,864,692 2/1975 McDonnell ........ 346/75
3,959,797 5/1976 Jensen ........ 346/75 X

OTHER PUBLICATIONS

Helinski, E.F.; Bidirectional Selection for a MIJ Printer; IBM Tech. Disc. Bulletin, vol. 18, No. 4, Sep. 1975, p. 1053.

Lo et al.; Modified Selector for MIJ; IBM Tech. Disc. Bulletin, vol. 18, No. 9, Feb. 1976, pp. 3121-3122.

*Primary Examiner*—Joseph W. Hartary
*Attorney, Agent, or Firm*—John S. Gasper

[57] ABSTRACT

A magnetic deflector for a magnetic ink jet printer has compensating pole pieces which alter the gradient field produced by deflection pole pieces so as to counterbalance centering forces acting on magnetic ink drops moving through the magnetic field in off center locations. The compensating pole pieces are preferably passive and extend from the zero potential region of the magnetic circuit of the deflection pole pieces.

12 Claims, 8 Drawing Figures

FIG. 3
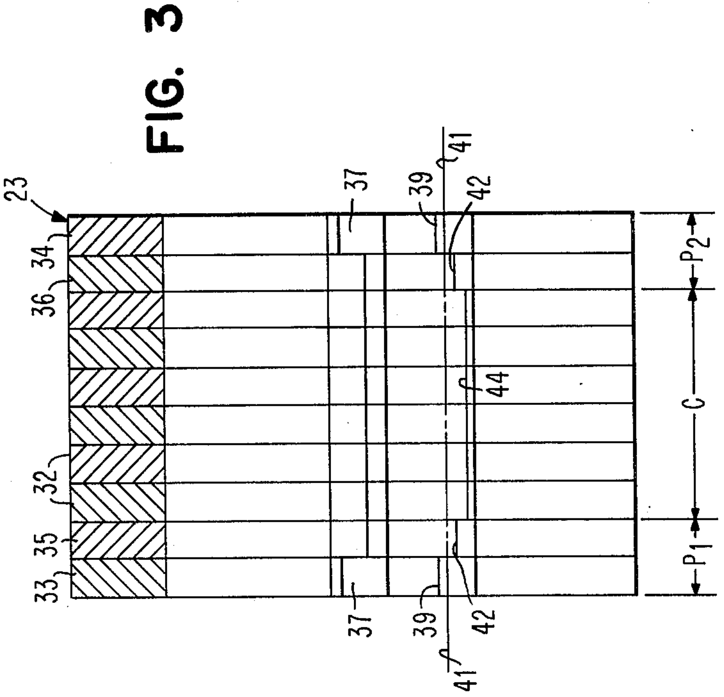
FIG. 4
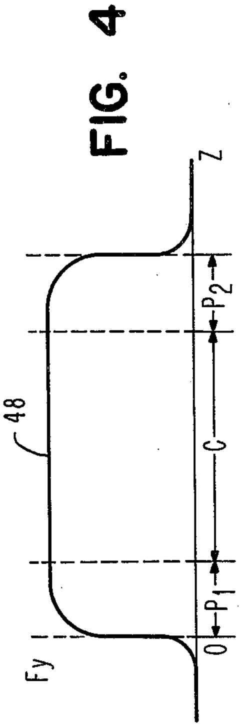
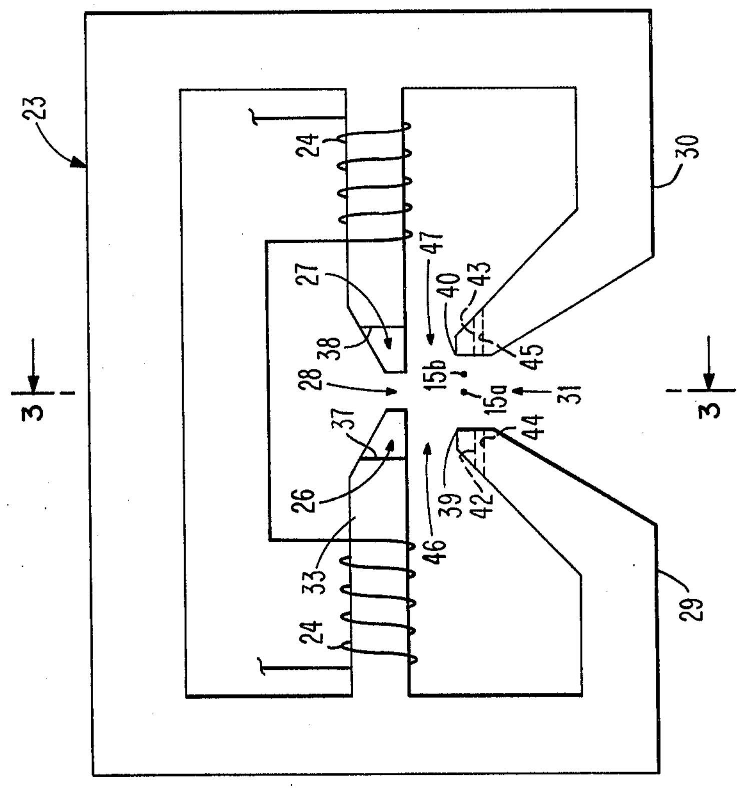
FIG. 2

MAGNETIC DEFLECTOR FOR A MAGNETIC INK JET PRINTER

BACKGROUND OF THE INVENTION

1. Field of the Invention

This invention relates to ink jet recorders and particularly to a magnetic jet printer.

2. Description of the Prior Art

In magnetic ink jet recorders of the type shown in U.S. Pat. No. 3,959,757, to D. F. Jensen on May 25, 1976, and U.S. Pat. No. 3,928,855, issued to E. F. Helinski, H. C. Lee and J. L. Zable on Dec. 23, 1975, a continuous stream of ferrofluid ink drops is projected successively past electromagnetic selector and deflector devices. The selector, which is energized in timed relation with the flight of the ink drops, applies a magnetic field force to certain drops not used for printing causing them to be horizontally deflected to follow a new trajectory leading to a drop catcher located in advance of the print medium. All the ink drops, both selected and non-selected, i.e. unused and print drops, are then subjected to a time dependent magnetic field force gradient, as shown in U.S. Pat. No. 3,864,692, issued to J. A. McDonnell, R. E. McGuire and R. Radlinsky on Feb. 4, 1975, which deflects a grouping of drops various amounts in the vertical direction. The selected drops go to the drop catcher and the print drops become deposited on the print medium in accordance with the desired data pattern.

Heretofore, the electromagnetic deflector comprised a C-shaped magnetic core terminating in a pair of oppositely disposed pole pieces. The faces of the pole pieces are tapered to form an upwardly-extending wedge-shaped air gap, which produces a non-uniform magnetic gradient. The deflector magnetic core is located relative to the stream of drops such that the trajectories of both the selected and print drops pass through the air gap. The trajectory of the print drops is generally in the center of the air gap while the trajectory of the selected print drops is displaced to one side of the center. The magnetic core has a thickness equivalent to several drop wavelengths, thereby providing an elongate axial air gap such that a plurality of drops is always within the air gap for a time interval during which a raster scan signal such as a linear sawtooth or a staircase ramp is applied to the energizing winding on the core in accordance with the technique described in the previously mentioned McDonnell et al patent.

When the raster scan signal is applied to the energizing winding of the magnetic deflector, ink drops within the air gap become polarized and are deflected within the gap in the direction of increasing flux density, i.e. toward the narrower region of the air gap.

To print at higher print rates, the flight velocity of the drops must be increased and the spacing of the drops must be decreased. The amount of deflection, however, must be very substantially increased. The deflection force can be increased simply by aiming the drop stream to be centered closer to the narrow portion of the air gap. Doing that, however, will cause some of the ink drops to crash into the pole faces, thereby contaminating them and affecting their proper operation and the ultimate print quality. An alternative solution to get an increased deflection force is to aim the stream so that the ink drops are centered outside the air gap proximate the narrowest region of the gap. The external stream, however, presents a problem in that the unused, i.e. the selected, ink drops which were horizontally deflected by the selector, now move through an off-center part of the field in which they experience a centering force which tends to cancel the selector angle, thereby causing the unused drops to miss the drop catcher and become deposited on the print medium to undesirably affect print quality.

SUMMARY OF THE INVENTION

It is therefore a general object of this invention to provide an improved magnetic ink jet recorder.

It is a more specific object of this invention to provide a magnetic ink jet recorder capable of printing at higher print rates.

It is a further more specific object of this invention to provide an electromagnetic deflector for a magnetic ink jet recorder which eliminates the problem of ink drop crashing and overcomes the effects of centering forces acting on unused ink drops.

It is a still further object of this invention to provide an electromagnetic deflector for a magnetic ink jet recorder which achieves the above objects with a relatively simple magnetic structure which can be readily manufactured and installed.

Broadly, the above as well as other objects, are attained in accordance with this invention, by providing a magnetic deflector for a magnetic ink jet recorder which has compensating magnetic pole pieces located in the vicinity of the ink stream which interact with the external magnetic field of the deflection pole pieces to counterbalance centering forces acting on ink drops moving through the external magnetic field region formed in the region of the air gap between the deflection pole pieces. In its preferred embodiment, the compensating pole pieces are passive and preferably are formed as an integral part of the magnetic core structure with the deflection pole pieces. The arrangement of the deflection and compensating pole pieces is such that the compensating pole pieces extend from the core structure from the region of zero or negligible potential in the magnetic circuit.

In the practice of this invention, the deflection pole pieces form an elongate axial air gap whose length corresponds to plural drop wavelengths. The ink drops move through the magnetic field external to the air gap. The compensating magnetic pole pieces form a second air gap axially co-extensive with the air gap of the deflection pole pieces. In accordance with a further feature of this invention, the compensating pole pieces have pole face regions at opposite ends of the axial air gap which extend closer to the deflection poles and the ink drops than the intermediate section. In addition to providing an improved compensation of the deflection field gradient produced in the vicinity of the gap, the enlarged end extremities provide a means for preventing external fringing effects on ink drops before they enter and after they leave the deflector.

The net effect of the compensating pole pieces for the magnetic deflector is to modify the magnetic field gradient in such a way to counterbalance centering forces produced by the magnetic field external to the deflection pole piece air gap. Thus, ink drops deflected from the center trajectory by the selector means when deflected vertically by the magnetic deflector, do not experience a centering force causing them to move toward the center of the magnetic field in line with the print drops. Thus, the selector angle is not diminished and unused ink drops readily become deposited in the ink drop catcher. Furthermore, the provision of compensating magnetic pole pieces is readily obtained without special structures by forming the magnetic core as an integral unit in which the compensating pole pieces extend from the common magnetic structure with the deflection pole pieces. Such a structure, in addition to being easy to manufacture and assemble, can readily be installed without difficulty, since the integral compensating pole needs no further adjustment following assembly.

The foregoing and other objects, features and advantages of the invention will be apparent from the following more particular description of preferred embodiments of the invention, as illustrated in the accompanying drawing.

BRIEF DESCRIPTION OF THE DRAWING

FIG. 2 is an elevation view of the magnetic deflector shown in FIG. 1;

FIG. 3 is a cross-section of the magnetic deflector of FIG. 2 taken along the section line 3—3;

FIG. 4 is a graph showing the magnetic field gradient for the magnetic structure of FIGS. 1–3;

DETAILED DESCRIPTION OF THE INVENTION

Figure 1:
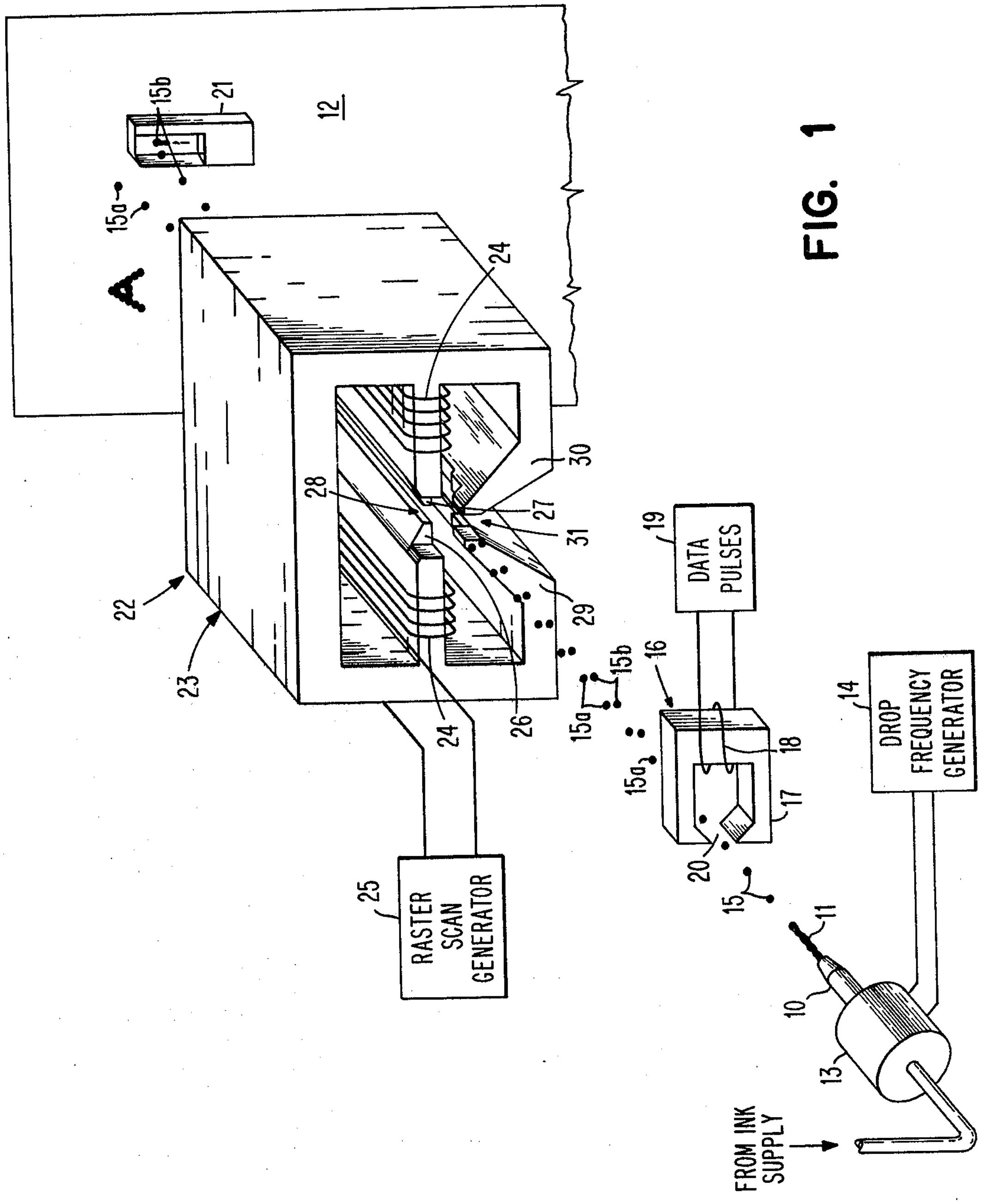
FIG. 1 is an isometric drawing showing a schematic version of a magnetic ink jet recorder which uses the magnetic deflector made in accordance with the invention.

As seen in FIG. 1, the essential elements of an ink jet recorder for practicing this invention comprises a nozzle 10 connected to an ink supply which provides ferrofluid ink under constant pressure to cause a continuous jet stream of fluid ink 11 to be projected in a direction transverse to print medium 12. An electromechanical transducer 13 attached to nozzle 10 and energized by a drop frequency generator 14 causes the nozzle to be vibrated such that individual ink drops 15 are formed with substantially uniform spacing and size in accordance with the frequency of the energizing signal applied to the transducer 13. Various transducers are well-known in the art which use piezoelectric crystals or magnetostrictive elements to vibrate nozzle 10 and can be used for generating the ink drops 15 for the purpose of this invention. Located downstream from the nozzle 10 is a horizontal electromagnetic selector 16 comprised of a C-shaped magnetic core 17 and energizing winding 18 connected to a source of energizing data pulses 19. The ink drops 15 are directed to pass adjacent to a gap 20 in core 17. When winding 18 of selector 16 is energized by pulses from data source 19, a non-uniform magnetic field is produced in the vicinity of gap 20. A drop located adjacent to gap 20 during energization experiences a horizontal deflection force field in the direction of gap 20. Drops 15 adjacent to gap 20 when no magnetic field is present continue to move undeflected toward paper 12 in the initial straight line trajectory and are identified as drops **15*a*. Drops not to be used for printing are deflected by the electromagnetic selector 16 to move in a second trajectory toward an ink drop catcher 21. Unusued drops are identified by numeral 15*b***.

Located downstream from selector 16 in advance of catcher 21 is vertical magnetic deflector 22, which operates to deflect print drops **15*a* and unused print drops 15*b* in the vertical direction. Vertical deflector 22 comprises a magnetic core 23 and coil 24 connected to be energized by repeated scans of electric signals from a raster scan generator 25. Magnetic core 23 has a pair of inwardly extending deflection pole pieces 26 and 27 whose ends are preferably shaped to form a uniform elongate air gap 28. Energizing coil 24 is wound in pole pieces 26 and 27 in a manner which causes the pole pieces to be oppositely polarized while coil 24 is energized by signals from raster scan generator 25**.

In accordance with this invention, magnetic core 23 is further provided with a pair of inwardly extending compensating pole pieces 29 and 30 separated by a wider air gap 31 whose vertical center line preferably is coincident with the center line of air gap 28. Further in accordance with this invention, the extremities of compensating pole pieces 29 and 30 are located within the region of the magnetic field of deflection poles 26 and 27 external to gap 28 so as to alter the magnetic field gradient thereof to counterbalance horizontal centering forces produced by the external magnetic deflection field on droplets **15*b*, which as previously described are moved off center relative to the center line of the air gap 28**.

As seen in more detail in FIGS. 2 and 3, magnetic core 23 comprises a stack of laminations formed from stampings or etchings of magnetic material. In this manner, the deflection pole pieces 26 and 27 and compensating pole pieces 29 and 30 are made integral parts of the common magnetic circuit. In the preferred embodiment of this invention, the laminations 32 in the central region C of core 23 (see FIG. 3) are essentially identical, whereas, the end laminations 33 and 34 have modified pole tip structures for the purpose of reducing fringing of magnetic flux which can affect the motion and positions of the ink drops **15*a* and 15*b*, particularly at the top and bottom of the raster, before and after they enter the region of the deflection magnetic field within deflector 22 proximate air gap 28. Essentially, the deflection pole pieces 26 and 27 are structured to be tapered inwardly. In the preferred form tapering is attained by notches at opposite ends of the air gap. The compensation pole pieces 29 and 30 correspondingly have pole tip extensions at opposite ends of air gap 31**.

Figure 5:
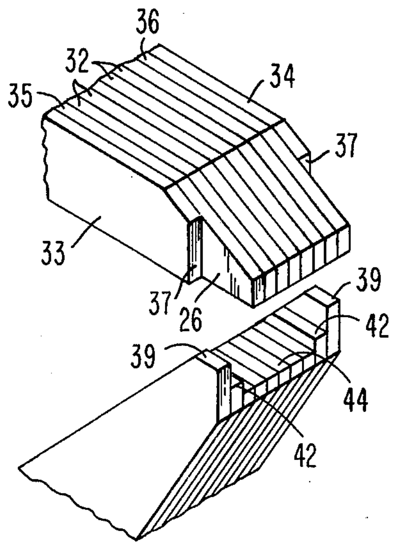
FIG. 5 is an isometric view fragment of the magnetic deflector of FIGS. 1–3.

As best seen in FIGS. 2, 3 and 5, end laminations 33 are terminated at edges 37 and 38, which are set back from the ends of the deflection pole pieces 26 and 27 to form a notch. The end laminations 33 are further provided with pole tips 39 and 40 which extend the compensation pole pieces 29 and 30 upwardly toward the pole pieces 26 and 27, preferably to a height above the entering flight trajectories of ink drops **15*a* and 15*b*, as shown by broken line 41 in FIG. 3. The net effect of this pole piece end structure is to produce a flux distribution internal to core 23, such that the magnetic force in the vertical direction is highest in region C and substantially uniform, but which degrades rapidly at the ends of the magnetic core 23 in the regions P1 and P2. The vertical force distribution in the axial direction for the structure of FIGS. 2 and 3 is shown by curve 48 in FIG. 4**. It will be noted from this figure that the magnetic force F(y) is at its highest intensity and substantially flat throughout the region C, whereas, it slopes rapidly through the regions P1 and P2 so that there is virtually no fringe magnetic force external to magnetic core 23.

As noted, the primary role of the end laminations 33 and 34 is to reduce axial fringing of deflector poles 26 and 27. The secondary role is that these end laminations 33 and 34 modify also the field gradient in the vicinity of gap 28 as some of the flux, which mainly flows from pole 26 to the opposite pole 27, would be diverted through the end laminations, i.e. from pole 26 to pole tip 39 and from pole 27 to pole tip 40. As these secondary paths create polar forces toward the horizontal gaps 46 and 47, the result is some cancellation of the horizontal centering forces on drops 15*b* passing through the off-center plane. Similarly, further cancellations of the horizontal centering forces are provided by additional tip extensions 42 and 43 of laminations 35 and 36, which extend beyond the edges 44 and 45 of laminations 32, but preferably are located below the entry trajectory line of ink drops 15*a* and 15*b*, as shown by line 41. The amount of the polar forces which cancel the centering forces is adjusted with the thickness and the extension heights for a given dimension of gap 31.

Although the end laminations 33 and 34, as described, may be preferred for the purpose of reducing the axial fringing and sharing the cancelling roll of horizontal centering forces, the pole tips 39 and 40 above the trajectory line 41 reduce the horizontal space for the selected drops. Therefore, if design limits require, end laminations may be eliminated shifting the role of providing polar force entirely to the inner polar tip extensions 42 and 43 of laminations 35 and 36. The primary role of the tips 44 and 45 across region C is for adding structural stiffness of the end laminations. The pole tips 44 and 45 for the compensating poles 29 and 30 across region C are set back from poles 26 and 27 such that horizontal centering force compensation is negligible in region C in the embodiment shown in FIGS. 2 and 3 where laminations 33–36 are used with the extended pole tips 39, 40, 42 and 43. However, in another design variation, the role of providing polar force for counterbalancing horizontal centering forces may be shared by those pole tips 44 and 45 by making them coextensive with tips 42, 43 and adjusting the common height to a proper value for a given value of the gap 31.

As previously discussed, in the preferred embodiment of the invention the compensating poles are passive. For that reason the pole windings in the embodiment shown in FIGS. 1–3 are applied only to pole pieces 26 and 27. In the magnetic structure of this configuration, compensating poles 29 and 30 extend from the region of zero potential generated in the magnetic circuit of core 23 by coil 24.

In a specific embodiment, a magnetic deflector was made with the following parameters:

| | | |
|---|---|---|
| Deflector thickness | — | 60 mils |
| Lamination thickness | — | 6 mils |
| Deflection gap 28 | — | 12 mils |
| Deflection gap 31 | — | 22 mils |
| Horizontal gaps 45 & 46 | — | 22 mils |
| Ampere Turns | — | 200 |

The magnetic deflector 23 is energized with a raster signal of 0–1 amps with a ferrofluid having a magnetic moment of 24 emu produced a 160 mil deflection of drops on a print medium located one inch from the deflector.

Figure 6:
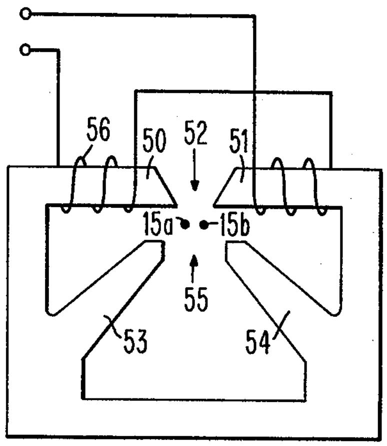
FIGS. 6 and 7 show other embodiments in plan view of magnetic deflectors made in accordance with the invention in which compensation pole pieces are passive.
Figure 7:
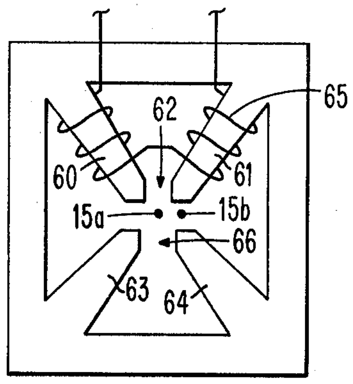
Figure 8:
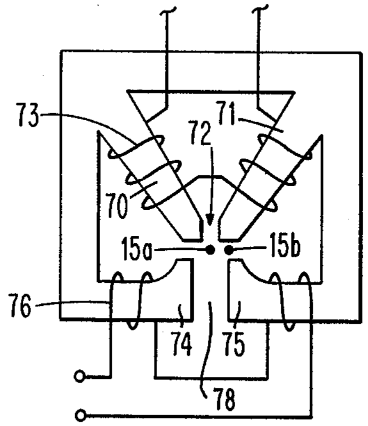
FIG. 8 illustrates an embodiment of the invention in which the compensation pole pieces are energized to provide active compensating field forces.

In the embodiments of FIGS. 6 and 7 the positions of the deflection pole pieces and compensating pole pieces are reversed. In the embodiment of FIG. 6, the deflection pole pieces 50 and 51 are separated by a wedge-shaped air gap 52. Ink drops 15*a* and 15*b* are aimed to pass outside of and in proximity to the narrow portion of gap 52 where the non-uniform magnetic field gradient exists. Compensating poles 53 and 54 are located below deflection poles 50 and 51 to form air gap 55, which is wider than and centered with air gap 52. Coil 56 on poles 50 and 51 generate a deflection magnetic field which has its highest flux density in the narrow region of gap 52. Compensating poles 54 and 55 are passive poles extending from the region of zero potential of the poles 50 and 51. In the embodiment of FIG. 7, the deflection poles 60 and 61 on opposite sides of uniform air gap 62 are formed in a completely closed magnetic circuit which includes the integral compensating poles 63 and 64 separated by the wider air gap 66. Coil 65 on the deflection poles 60 and 61 produces the uniform magnetic gradient within air gap 62, but a non-uniform magnetic gradient external to the air gap 62 in the region of the trajectories of drops 15*a* and 15*b*. FIG. 8 shows a magnetic deflector in which both compensating and deflection pole pieces are active. In FIG. 8 the deflection poles 70 and 71 have a uniform air gap 72 and energizing coil 73. Compensating poles 74 and 75 which form an air gap 76 have a second energizing coil 76.

In the embodiment of FIG. 8, the lower gap 78 and horizontal gaps can be arranged to develop without compensation coils 76 either a centering force or polar force on drops passing through trajectories which are not on the plane of vertical symmetry. The compensation coils 76 can be energized to counteract those forces. To develop polar force to counterbalance the centering force, polarity must be equal for diagonal poles, i.e. the polarity of 70 and 75 must oppose the polarity of the other diagonal poles 71 and 74. To develop centering force left poles 70 and 74 must have the same polarity and opposite to the polarity on the right poles 71 and 75.

As the degree of developed horizontal force, either polar or centering, depends on the compensation energization, active poles, unlike passive poles, offers easy means of adjustments for change of trajectories and other operating conditions which may require change of compensation.

Typically, suppose that the upper and lower gaps are equal, the horizontal gaps are about twice the vertical gaps and the drops pass through the center plane of the horizontal gaps. About 5% of upper magnetization would be required for compensation poles to neutralize polar force which exists without the compensation coils. Since this percentage remains constant for a given operating condition, the upper and lower coils can be wound in series with the proper winding ratio (say 20:1).

In all embodiments of FIGS. 6 and 8, the compensating poles could include the fringe compensation and centering force compensation pole tip structures as in the embodiments of FIGS. 2 and 3. While this invention has been illustrated with a laminated core structure, other core structures could be used, such as sintered ferrite cores; however, the laminated core structure is preferable for high frequency operation.

While the invention has been particularly shown and described with reference to preferred embodiments thereof, it will be understood by those skilled in the art that the foregoing and other changes in form and details may be made therein without departing from the spirit and scope of the invention.

I claim:

1. An ink jet recording system including means for producing a stream of ferrofluid ink drops, and
 electromagnetic deflection means for deflecting said ink drops in a direction transverse to the direction of travel of said stream of ink drops
 said electromagnetic deflection means including a first magnetic means defining an axial air gap extending along a plural drop segment of said stream,
 said gap being shaped to produce a non-uniform gradient magnetic field in the region external to said air gap for the vertical deflection of said ink drops,
 said electromagnetic deflection means including second magnetic means in said region,
 said second magnetic means being operable to counterbalance horizontal centering forces affecting ink drops moving off center through said magnetic field.

2. An ink jet recording system in accordance with claim 1 in which
 said second pole pieces define a second air gap in line with said air gap formed by said first magnetic pole pieces.

3. An ink jet recording system in accordance with claim 1 in which
 said second magnetic pole pieces are passive magnetic elements.

4. An ink jet recording system in accordance with claim 3 in which
 said second air gap is wider than said air gap formed by said first magnetic pole pieces.

5. An ink jet recording system in accordance with claim 1 in which
 said first magnetic means of said electromagnetic deflection means comprises first magnetic pole pieces forming said air gap and
 said second magnetic means of said electromagnetic deflection means includes second magnetic pole pieces for modifying said magnetic field produced in the vicinity of said air gap by said first magnetic pole pieces to counterbalance said horizontal centering forces on said drops.

6. An ink jet recording system in accordance with claim 5 in which
 said first and second magnetic pole pieces have end regions contoured to prevent fringe deflection forces acting on ink drops external to said deflection means.

7. An ink jet recording system in accordance with claim 6 in which,
 said end regions of said first magnetic pole pieces are inwardly tapered, and
 said end regions of said second magnetic pole pieces have pole tip extensions for providing a reduced air gap between said first magnetic pole pieces and said second magnetic pole pieces in said end regions.

8. An ink jet recording system in accordance with claim 7 in which
 said pole tip extensions further alter the flux distribution in said end region for counterbalancing horizontal centering forces operable on ink drops within said deflection means.

9. An ink jet recording system in accordance with claim 8 in which
 said pole tip extensions in said end regions of said second magnetic pole pieces includes
 a first extension portion extending above the entry trajectory line of said ink drops, and
 a second extension portion below said trajectory line,
 said second extension position acting to further alter the flux distribution between said first magnetic pole pieces and said second magnetic pole pieces in said end regions for counterbalancing horizontal centering forces on ink drops within said deflection means.

10. An ink jet recording system in accordance with claim 9 in which
 said second magnetic pole pieces have a center section between said end sections,
 said center section being spaced from said first pole pieces so as to effectively provide no counterbalancing of horizontal centering forces in the center region of said deflection means.

11. An ink jet recording system in accordance with claim 5 in which
 said first and second magnetic pole pieces have end regions contoured to alter the magnetic flux distribution in said end regions for counterbalancing horizontal centering forces on ink drops within said deflection means.

12. An ink jet recording system in accordance with claim 5 in which
 said second magnetic means of said electro-magnetic means further comprises
 coil means on said second magnetic pole pieces,
 said coil means being energizable for adjusting the counterbalancing of said horizontal centering forces.

* * * * *